United States Patent
Randall et al.

(10) Patent No.: US 10,395,275 B2
(45) Date of Patent: Aug. 27, 2019

(54) SYSTEM AND METHOD FOR INTERACTIVE MARKETING

(71) Applicant: Sprinklr, Inc., New York, NY (US)

(72) Inventors: Stephen Randall, Wellesley, MA (US); Stephen H. An, Boston, MA (US); Jeffrey P. Potter, Cambridge, MA (US)

(73) Assignee: Sprinklr, Inc., New York, NY (US)

( * ) Notice: Subject to any disclaimer, the term of this patent is extended or adjusted under 35 U.S.C. 154(b) by 915 days.

(21) Appl. No.: 14/537,121

(22) Filed: Nov. 10, 2014

(65) Prior Publication Data

US 2015/0154635 A1   Jun. 4, 2015

Related U.S. Application Data

(62) Division of application No. 11/666,628, filed as application No. PCT/US2005/040186 on Nov. 4, 2005, now Pat. No. 8,886,759.

(Continued)

(51) Int. Cl.
*G06Q 30/00* (2012.01)
*G06F 15/16* (2006.01)
(Continued)

(52) U.S. Cl.
CPC ....... *G06Q 30/0255* (2013.01); *G06Q 20/322* (2013.01); *G06Q 30/00* (2013.01);
(Continued)

(58) Field of Classification Search
CPC .......... G06Q 30/02; G06F 15/16; H04Q 1/30
(Continued)

(56) References Cited

U.S. PATENT DOCUMENTS

| | | | |
|---|---|---|---|
| 5,781,889 A | 7/1998 | Martin et al. | 705/1 |
| 6,484,148 B1 | 11/2002 | Boyd | 705/14 |

(Continued)

FOREIGN PATENT DOCUMENTS

| | | | | |
|---|---|---|---|---|
| EP | 1 313 086 A1 | 5/2003 | | G06F 19/00 |
| JP | 2001-045022 | 2/2001 | | H04L 12/28 |

(Continued)

OTHER PUBLICATIONS

European Patent Office, European Search Report, Patent Application No. 05825531.6-2416/1813083 dated Dec. 1, 2009.

(Continued)

*Primary Examiner* — Sun M Li
(74) *Attorney, Agent, or Firm* — Ice Miller LLP

(57) ABSTRACT

A system and method of interactive, location-based presentation and advertising that enables users with wireless network addressable communications devices to control multimedia content on network addressable screens and enables marketers to track, monitor and respond to users interactions in real time. A Proxy Gateway directs a network addressable client PC, connected to a digital display, to serve local content or pull content from one or more web servers. A wireless, network addressable device, typically a mobile phone, is used to communicate commands to the physically remote Proxy Gateway. The Proxy Gateway bridges between the communications device and the display by interpreting the commands from the communications device, forwarding them to the client PC which may pull content from the appropriate web server, or display native message content.

13 Claims, 8 Drawing Sheets

Related U.S. Application Data

(60) Provisional application No. 60/624,712, filed on Nov. 4, 2004.

(51) Int. Cl.
*H04Q 1/30* (2006.01)
*G06Q 30/02* (2012.01)
*G06Q 20/32* (2012.01)
*H04L 29/06* (2006.01)
*H04W 4/02* (2018.01)

(52) U.S. Cl.
CPC .......... *G06Q 30/0267* (2013.01); *H04L 63/10* (2013.01); *H04W 4/02* (2013.01)

(58) Field of Classification Search
USPC ................... 705/14.73; 709/219; 340/7.55
See application file for complete search history.

(56) References Cited

U.S. PATENT DOCUMENTS

| | | | |
|---|---|---|---|
| 6,606,481 B1 | 8/2003 | Tegler et al. | 455/5.1 |
| 6,608,556 B2 | 8/2003 | De Moerloose et al. | 340/501 |
| 7,085,566 B1 | 8/2006 | Burchard et al. | 455/434 |
| 7,266,615 B2 | 9/2007 | Yoneya et al. | 709/237 |
| 7,647,613 B2 | 1/2010 | Drakoulis et al. | 725/87 |
| 7,685,259 B2 | 3/2010 | Strand | 709/219 |
| 7,721,208 B2 | 5/2010 | Madden | 715/716 |
| 8,615,565 B2 | 12/2013 | Randall | 709/218 |
| 8,880,649 B2 | 11/2014 | Randall | 709/218 |
| 8,886,759 B2 | 11/2014 | Randall et al. | G06Q 30/00 |
| 9,247,002 B1 | 1/2016 | Randall | 709/206 |
| 2002/0023265 A1 | 2/2002 | Metcalf | 725/74 |
| 2002/0046084 A1 | 4/2002 | Steele et al. | 705/14 |
| 2002/0129089 A1 | 9/2002 | Hegde et al. | 709/200 |
| 2003/0009267 A1 | 1/2003 | Dunsky et al. | 701/4 |
| 2003/0018753 A1 | 1/2003 | Seki | 709/219 |
| 2003/0078840 A1 | 4/2003 | Strunk et al. | 705/14 |
| 2003/0105670 A1 | 6/2003 | Karakawa et al. | 705/14 |
| 2003/0126612 A1 | 7/2003 | Ikeda et al. | 725/105 |
| 2003/0221010 A1 | 11/2003 | Yoneya et al. | 709/227 |
| 2004/0158865 A1 | 8/2004 | Kubler et al. | 725/82 |
| 2004/0186989 A1 | 9/2004 | Clapper | 713/151 |
| 2004/0259553 A1 | 12/2004 | Delaney et al. | 455/445 |
| 2005/0021393 A1 | 1/2005 | Bao et al. | 705/14 |
| 2005/0286546 A1 | 12/2005 | Bassoli et al. | 370/432 |
| 2008/0301750 A1 | 12/2008 | Silfvast et al. | 725/131 |
| 2008/0307320 A1 | 12/2008 | Payne et al. | 715/751 |
| 2009/0019085 A1 | 1/2009 | Abhyanker | 707/104.1 |
| 2009/0150433 A1 | 6/2009 | Uusitalo et al. | 707/104.1 |
| 2009/0164641 A1 | 6/2009 | Rogers et al. | 709/227 |
| 2014/0108613 A1 | 4/2014 | Randall | 709/218 |

FOREIGN PATENT DOCUMENTS

| | | | |
|---|---|---|---|
| JP | 2002-032286 | 1/2002 | G06F 13/00 |
| JP | 2002-125264 | 4/2002 | H04Q 7/38 |
| JP | 2003-30072 | 1/2003 | G06F 13/00 |
| JP | 2003-296213 | 10/2003 | G06F 13/00 |
| WO | WO 02/05250 A1 | 1/2002 | G09F 19/00 |
| WO | WO 02/29665 A1 | 4/2002 | G06F 17/60 |
| WO | WO 2004/004857 A1 | 1/2004 | A63F 13/12 |

OTHER PUBLICATIONS

European Patent Office, Communication Pursuant to Article 94(3) EPC, Application No. 05825531.6/2416/1813083, dated Mar. 3, 2010, 1 page.

European Patent Office, Communication Pursuant to Article 94(3) EPC, Application No. 05 825 531.6-2416, dated Mar. 10, 2011, 5 pages.

International Searching Authority, International Search Report; International Application No. PCT/US05/40186, dated May 23, 2007 together with the Written Opinion.

International Searching Authority, International Preliminary Report on Patentability along with the Written Opinion regarding International Application No. PCT/US05/40186, 4 pages, dated May 23, 2007.

Japanese Patent Office, Official Action, Application No. 2007-540111, dated Feb. 23, 2011, 3 pages.

Japanese Patent Office, Official Action, Application No. 2007-540111, dated Feb. 23, 2011, 5 pages [English Translation].

Japanese Patent Office, Official Action, Application No. 2007-540111, dated Oct. 25, 2011, 4 pages.

Japanese Patent Office, Official Action, Application No. 2007-540111, dated Oct. 25, 2011, 6 pages [English Translation].

Kindberg et al., "People, Places, Things: Web Presence for the Real World," Internet and Mobile Systems Laboratory, HP Laboratories Palo Alto, HPL-2001-279, Oct. 31, 2001, 15 pages.

Madden, U.S. Appl. No. 60/724,622, filed Oct. 7, 2005.

ScreenMediaDaily.com, "Akoo To Launch Digital Out-of-Home Network In China," Dec. 7, 2010, 1 page.

Friendfeed, "friendfeed," http://friendfeed.com/about, 2 pages, dated Sep. 8, 2008.

Internet Archive Wayback Machine, "Internet Archive Wayback Machine" http://webarchive.org/web/*/http://www.thesyn.com, 1 page, dated Apr. 23, 2010.

Ilike, "About iLike," http://www.ilike.com/about, 6 pages, dated Sep. 8, 2008.

Ilike, "Take the tour—4 easy steps—Compare tastes," http://www.ilike.com/tour?page=3, 2 pages, 9 dated Sep. 8, 2008.

Ilike, "Take the tour—4 easy steps—Free MP3s by new artists," http://www.ilike.com/tour?page=4, 2 pages, dated Sep. 8, 2008.

Ilike, "Take the tour—4 easy steps—Add friends, get music," http://www.ilike.com/tour, 2 pages, dated Sep. 8, 2008.

Ilike, "Take the tour—4 easy steps—Connect your music," http://www.ilike.com/tour, 2 pages, dated Sep. 8, 2008.

I-Systems Inc., "Feedreader OEM—White Label Solution," product description, http://www.feedreader.com/feedreaderoem, 3 pages, dated Sep. 8, 2008.

I-Systems Inc., "FeedReader Connect," product description, http://www.feedreader.com/feedreaderconnect, 4 pages, dated Sep. 8, 2008.

I-Systems Inc., "FeedReader overview," product description, http://www.feedreader.com/features.php, 4 pages, dated Sep. 8, 2008.

NTN Buzztime, Inc., "About NTN Integrated Solutions," http://ntnsoftware.com/about/history.asp, 2 pages, 2007.

Touch Tunes, "my Touch Tunes/Be Your Own DJ," http://web.archive.org/web/20080709182459/http:www.mytouchtunes.com/, 2 pages, dated Apr. 23, 2010.

USPTO, Non-Final Office Action, U.S. Appl. No. 11/666,628, 20 pages, dated Mar. 16, 2010.

SYSTEM AND METHOD FOR INTERACTIVE MARKETING

CROSS REFERENCE TO RELATED APPLICATIONS

This application is a divisional of U.S. patent application Ser. No. 11/666,628, filed Nov. 4, 2005, which has a 35 U.S.C. § 371 filing date of Apr. 30, 2007, titled "System and Method for Interactive Advertising" (now U.S. Pat. No. 8,886,759, issued Nov. 11, 2014), which, in turn, is a National Phase filing of, and claims priority to, PCT/US2005/40186 filed on Nov. 4, 2005, which, together with this application and the '628 application, each claims priority to U.S. Provisional Patent Application No. 60/624,712, filed Nov. 4, 2004, titled "System and Method for Interactive Marketing," the entire contents of all of which are hereby incorporated by reference herein, for all purposes.

TECHNICAL FIELD

The present invention relates to systems, methods and apparatus for controlling and/or navigating content on network addressable screens via electronic communications devices, and particularly to systems, methods and apparatus for the interactive control of screen content via a proxy gateway remote to both the screen and the control device, and connected to the screen and the control device by dissimilar networks.

BACKGROUND ART

Impulse purchases, in which an unplanned decision to purchase a product is made at a point of purchase, account, by some estimates, for as much as 50% of retail sales.

Merchants are, therefore, highly desirous of extending the persuasive power of television, and the interactivity of the Internet, to influence potential customers when they are at, or close to, a point of purchase. In particular, they would like to provide high impact, location-based advertising that reaches potential customers physically at, or near, a location where the items being advertised can be viewed or purchased.

Furthermore, other than the web, merchants have no way to interact with consumers beyond the threshold of their physical space.

In addition to increasing sales, merchants are also desirous of using such location-based systems to capture related information such as the contact information of a potential customer who showed an interest in a product, but did not commit to a purchase. Such contact information may be useful in, for instance, further targeted marketing of the product.

Existing attempts to provide point-of-purchase advertising include location-based advertising on location-based media such as "Out-of-home" digital media networks. These are essentially private television channels run by companies, organizations and advertisers in locations such as shopping malls, retail chains, or franchise operations that run conventional, television promotional material at or close to the point of purchase.

Other examples of point-of-purchase advertising include the interactive retail marketing systems designed to help consumers to find specific information on products and services. These include touch-screens, at or close to the point of purchase, used to promote products or to offer sales promotions or details such as pricing and availability.

There are, however, no existing point-of-purchase presentation systems that optimally leverage the combined power of high quality video displays and Internet-like personalized interactivity.

For example, a consumer looking in through the window of a store cannot operate the interactive systems detailed above, because none of them can be navigated remotely. This is problematic for a merchant wishing to capture the attention of consumers walking past their store window—especially when their store is closed. Furthermore, these systems cannot capture specific user information such as a mobile phone number without the user entering that data into the system.

Some advertising billboards or posters in retail spaces have been used to provide additional information to passersby by downloading that information into a personal digital assistant (PDA) using wireless technology. For instance, AdAlive Inc. of Lexington, Mass. and Wideray Corp. of San Francisco, Calif., are examples of companies that have marketed systems for consumers to download additional advertising information from existing advertising billboards or posters into Palm handheld computers or cell phones using wireless technology, such as infra-red transmission or the Bluetooth protocol. However, these systems typically use the low visual impact, small screen of a handheld device to display the additional information, and lack a feedback loop back to the actual advertising message. Because of this, the systems fail to maximize their impact on consumers. For example, they are unable to update the primary advertising medium, the existing advertising billboard or poster, by changing the content in response to feedback.

Internet-connected advertising systems, sometimes referred to as Out-of-home digital media networks or narrowcast networks, provide advertising that can be sent to specific locations, at specific times from a central control. One example of a company providing this service is Captivate Media Inc. of Westford, Mass., which provides video content to a network of screens in elevators. The screens are not interactive and have no direct way of measuring their effectiveness.

As with television, billboard advertisers have to wait many weeks or months before learning of the effectiveness of their campaigns.

Direct marketing systems, such as direct mail, target specific demographics with sales offers. The more accurate the marketer can be in targeting their required customer, the more likely it will be that they will achieve a higher "conversion rate," that is the rate at which prospective sales are converted into actual sales. Such systems typically have low conversion rates below 2%, and are slow to feed back performance metrics, in turn leading to slow improvement cycles.

Closed-loop direct marketing systems, such as direct email or website banner advertisements, improve the information the marketer has about the potential purchaser as they connect marketers with their customers in a continuous feed-back cycle, often capturing customer's reactions and strategically integrating those reactions into a targeted promotion such that the results are dramatically enhanced. Such campaigns invariably appear as "junk mail" as they necessarily target a wide group of prospective customers in order to convert a subset of that group. This results in a poor consumer reaction and experience. With a conversion rate around 2%, they are more economic for marketers than traditional direct mail and they are better suited to feed back performance metrics. However, the promotions are regarded as invasive and frequently undesirable.

Mobile communications devices, capable of browsing the Internet, are becoming more sophisticated every day and are technically capable of providing many, if not all of the features of a computer connected to the Internet. Whilst many people have access to services on the web via a mobile communications device, the reality is that devices designed for mobility tend to have smaller screens than desktop computers, televisions, and out-of-home screens. As a result, products and services are difficult to discover and/or access. Flipping open a phone, selecting a web browser, typing in a web site address, then clicking or searching for the specific product information can be too complex for many consumers. It has been claimed that every "click" on a website can lose up 25-33% of a website's visitors, which gives the marketer a maximum of 4 clicks to address consumers' interests. Marketers are, therefore, keenly aware of the need to reach consumers with the minimum number of clicks.

Web-based systems can leverage information pertaining to user's preferences, by using "cookies" on a user's computer and inviting the user to click through various offers. These systems are not suited to retail environments, as the users are away from their own computers.

Internet-connected kiosks sited in retail environments can automate sales and promotions. These systems target one customer at a time and typically serve fixed applications such as tickets, internet connection, or cash machines. A problem with kiosks is that the user is required to touch or type to engage with the system, i.e. physical contact is required in order to engage, therefore the system cannot be placed behind a physical protective barrier, such as behind the window of the storefront and still allow users to access the system. A further problem is that these systems are not ideally placed externally due to weather. The system can't support more than one user at a time.

Telephone systems and call centers with interactive voice response systems can provide 24/7 support for callers, but they do not provide visual information to the caller.

What is needed is a method and system for location-based display of multi-media content that overcomes these problems, particularly the lack of interactivity or the reliance on small, low impact screens.

SUMMARY OF EMBODIMENTS

The present invention provides a system and method of interactive, location-based presentation and advertising using network addressable screens that enable the interactive display of multi-media content and the real-time tracking, or monitoring of a user interaction with the presentation.

In a preferred embodiment the interactive, location-based advertising and content is provided by a platform that enables mobile communications devices such as, but not limited to cellular phones, to be used to control and access content and data on network addressable screens via a distributed web-based service with a closed-loop marketing system and database. In particular, cellular phones may be used to interactively control presentations on location-based screens that may be, but are not limited to, high-definition, large format display panels.

Such a system allows merchants to attract mobile consumers using web-based content such as, but not limited to, video, presented on network addressable screens that may, for instance, be connected to the Internet. Furthermore, because the screens may be controlled via a network addressable, mobile communications device, the system can record the user's responses to the presentation and may update the display screen in response to the user's commands. Moreover, the user's interaction may be logged and the user's patterns of interest archived in a database. The mobile consumer can control and/or access content and data that they see on the merchant's screen by entering commands on their mobile communications device. The merchant can access the database to see consumers' interests and follow up on specific queries.

In a further preferred embodiment, the interactive, location-based display consists of displaying a media presentation on a network addressable screen. The presentation typically has one or more image content elements and is served by a remote content sever via a first network. Interactive control of the presentation is achieved using a wireless, network addressable communications device. This device is addressable using a second network that is dissimilar to the first network. The device is, therefore, used to send commands that may be selected in response to the content elements of the presentation, to a proxy gateway, via the second network. The proxy gateway then bridges between the two, dissimilar networks. The proxy gateway is typically located remote to the network addressable screen, the content server and the communications device, and is typically linked to the content server and the screen by the first network, while being linked to the communications device by the second network. Bridging between the networks typically includes automatically generating a proxy command for the commands received from the communications device. The proxy commands may also be automatically associated with the appropriate content server and automatically routed to that content server over the first network.

Having two such networks bridged by a proxy server allows a number of applications to function, including the ability for a search, or journey, started on one network to be continued on another. For instance, a user may surf to a website on a home computer and, after research, locate a desired type of object, and a place that the object is on sale. The user may bookmark that object and location by providing their cellular phone number and bookmark that object. The user may then physically go to the location where the object is available, and phone a number on a network addressable screen at that location. When the system receives the call, it will recognize the cellular number, and display instructions related to the bookmarked object such as, but not limited to, displaying the particular aisle the object is located in, or the nature of accessories available at the location that may be useful with the bookmarked object.

BRIEF DESCRIPTION OF THE DRAWINGS

The invention will be more fully understood by referring to the following Detailed Description of Specific Embodiments in conjunction with the Drawings, of which.

DETAILED DESCRIPTION OF SPECIFIC EMBODIMENTS

Figure 1:
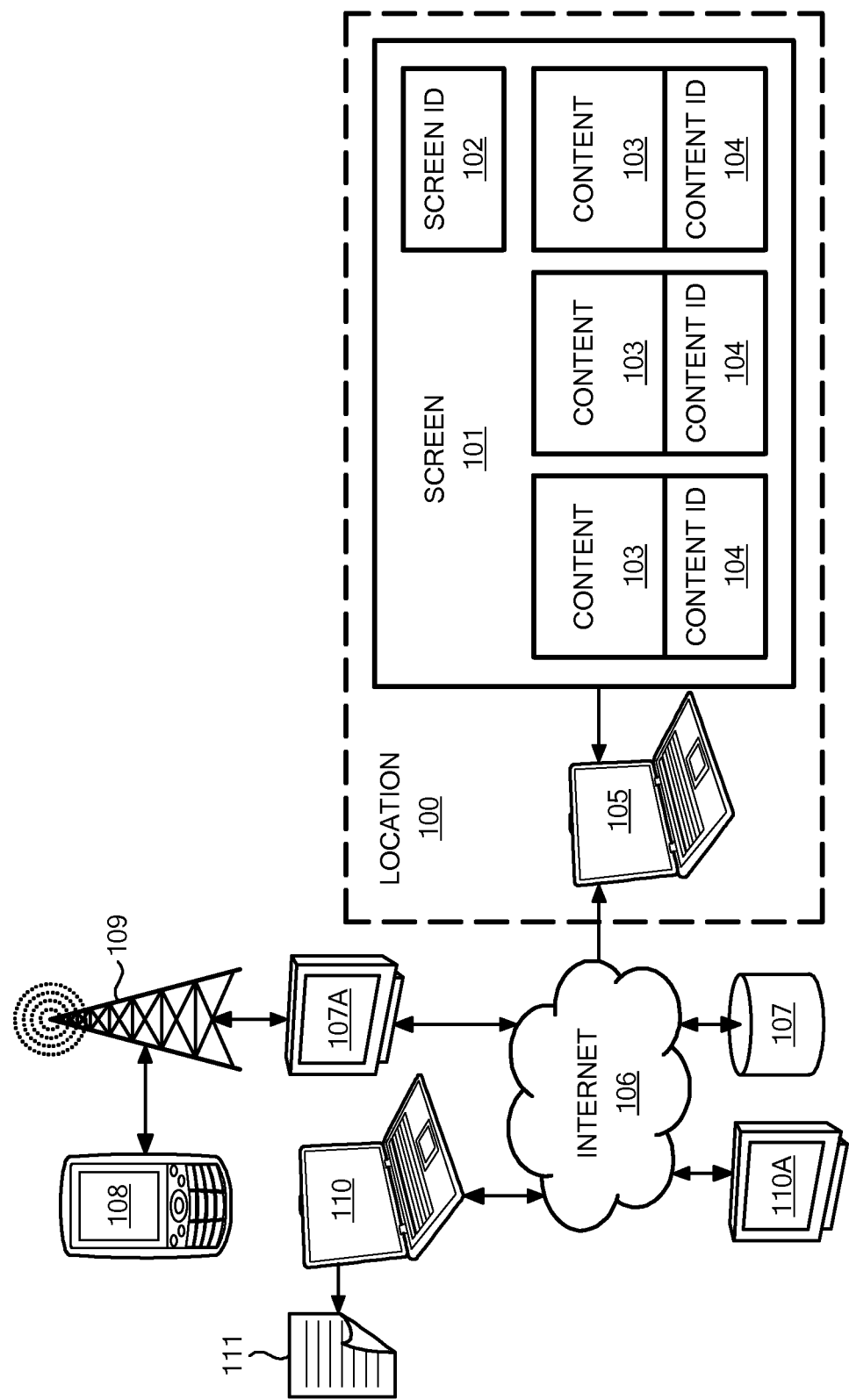
FIG. 1 is a high level view of the system.

The present invention relates to systems, method and apparatus for location-based content presentation that combine the ability to make high quality audio-visual presentations with the scalability, interactivity and traceably of Internet or web-based multimedia presentations.

In a preferred embodiment of the invention, the interactive control of information on a network addressable screen is accomplished by a display controller that is typically a mobile, network addressable communications device. The communications device, however typically operates on a first network using a first command protocol, while the display operates on a second network having a second command protocol, with the two networks being dissimilar to each other. The interactive control of the content displayed on the network addressable screen by the display controller is, therefore, accomplished by using a proxy gateway. The proxy gateway receives commands in the first protocol from the communications device, it then translates and generates proxy commands in the second protocol.

These proxy commands may then be sent to a content server that has been registered with the proxy gateway as being associated with the network addressable screen and the network addressable communications device. The content server may be, but is not limited to, a web server.

The presentation served by the content server to the network addressable screen may include, but is not limited to, image content elements, either as graphics or as video or a combination thereof.

The proxy gateway may be located to be physically remote from the network addressable screens, the wireless, communications device and the content server. The proxy gateway may automatically bridge between the dissimilar networks and their dissimilar operating protocols, by means of software modules running on general purpose digital computing devices. The bridging software modules may automatically generate proxy commands for the commands received from the communications device, automatically associate the proxy commands to the content server and then automatically rout the proxy commands via a communications network to the linked content server.

It is worth noting that the input need not to be limited to a communication device on a wireless network, but may be any network addressable communications device including, but not limited to a touch screen, an infrared sensor, an electronic camera or any electronic input signaling.

On receiving the proxy command routed from the proxy gateway, the automatic content server may serve additional content to the network addressable screen via the communications network. The additional content preferably includes further image content element.

In a specific preferred embodiment of the invention, the network addressable screen may be a high quality video display such as, but not limited to a high definition, large screen plasma or LCD television screen in a store window, connected to the internet via an IP (Internet Protocol) enabled appliance such as, but not limited to, a personal computing (PC) device. The content being presented on the high quality display may be, but is not limited to, a web-page fed to the network addressable screen via the Internet and containing multi-media content elements including, but not limited to, high quality images, text or video.

The network addressable communications device used as an interactive, presentation controller may be, but is not limited to, a cell phone. The user may for instance, phone a telephone number displayed on the network addressable screen. The call to that number may, for instance, then be routed via a wireless telephone network to a proxy gateway that is also linked to the screen. The number called may for instance, identify the network addressable screen. The user making the call may for instance be identified and tracked by their telephone number.

Interactive control of the presentation, which may be, but is not limited to, a web-page, may be made by, for instance, the user pressing numbers on their phone, issuing voice commands that are mediated by appropriate voice-recognition software or by sending short message system (SMS) protocol messages.

In a preferred embodiment the web pages have well defined HTML tags, included in the normal hypertext markup language (HTML) format. In this way, a content server that receives messages from the user via the proxy gateway can translate those messages into required proxy commands via appropriate software modules.

Various features and methods of the invention will now be described in more detail in the context of an interactive self-help system and method, and by reference to the accompanying diagrams in which, as far as possible, like numbers represent like elements.

FIG. 1 illustrates the basic components of a preferred embodiment of the system. A network addressable screen 101 displays content 103 which is tagged by a content identifier, 104. The network addressable screen 101, is typically but not exclusively located at a retail location or public space, and may be individually addressable in order to display marketing data of a kind determined by its physical location, and may be capable of displaying messages, information, interactive software, marketing and advertising campaigns in multimedia form that may include, but is not limited to, text, video, images or audio, or some combination thereof.

Each network addressable screen in the system may display an identifying number, or screen ID, 102, that is unique to that screen. Multiple screen IDs can be associated with a screen, for example, to allow for different modes of connectivity or further enhance the mobile user experience by enabling multiple users to engage with one screen. A client manager, 105 may be connected to the network addressable screen 101 and to a network 106 such as the Internet. A user's mobile network addressable communications device 108, can communicate with the system via a wireless network 109. A proxy gateway 107A may bridge between the wireless network 109 and a second network 106 that may for instance be the Internet.

The proxy gateway 107A may include, but is not limited to, software modules that translate the specific originating protocol 109 into a standardized and universal event format such as an XML protocol including, but not limited to the ReachPointEventXML protocol of LocaModa Inc. of Somerville, Mass., and generate proxy commands which are sent to content server 110A via the client manager 105. It is worth noting that any originating protocol command, such as, but not limited to an SMS or IVR protocol command, may be translated into a universal and uniform event and may be sent to a content server 110A. The proxy command generating module may also be wholly or partially located in a related messaging system communications interface 107.

An Interactive Voice Response (IVR) system communications interface 107, may for instance, receive and interpret consumer commands that are proxy commands for those inputted on their mobile communications device and relays those commands to a system manager 110. The system manager 110 may log consumer information and pass the commands over the Internet to the client manager 105 that may then update the screen 101.

Alternatively the proxy commands generated by the proxy gateway 107A may be associated with a particular content server 110A, that is typically a web server, and routed from the proxy gateway 107A to the content server 110A via the network 106. On receiving the proxy commands, the content server 110A may then serve further display elements 103 to the network addressable screen 101 via the network 106 and the client manager 105.

Those of ordinary skill in the art will appreciate that the network addressable screen 101 used in the system and method of the present invention may be any suitable electronic display device that is capable of being connected to a network and displaying digital content. The network addressable screen 101 may for instance be, but not limited to, a projector, a Light Emitting Diode (LED), a plasma screen, a liquid crystal display (LCD) screen or a cathode ray tube (CRT).

In a preferred embodiment, the user's network addressable communications device 108 may be a cellular phone, routing messages via a cellular network 109. One of ordinary skill in the art will, however, appreciate that the system and method of this invention may also be implemented using any network addressable communications devices 108 that are designed to work with a suitable wireless network. The network addressable communications device may work with a network such as, but not limited to a 802.11 (WiFi) wireless system, a Bluetooth network, an Infra Red or optical network, a Zigbee protocol network, a WiMax network, or any suitable combination thereof, so long as that network enables wireless control of the network addressable screen 101 by the methods of the present invention.

In a further embodiment of the invention, the network addressable device 108 may be a voice over internet protocol (VoIP) enabled device. Such a VoIP enabled device may facilitate a more integrated design in which one or more of the web components of the system are within the mobile device rather than remote. For instance, one or more of the protocol bridging software modules may reside on the VoIP enabled communications device 108, and may be programmed in languages such as but limited to BREW or J2ME. In a further embodiment, the mobile device 108 may include some or all of the software modules required for speech recognition.

A user, seeing content of interest on the network addressable screen, 101, may interact with that content by dialing the screen ID, 102, on their network addressable communications device 108. The screen ID 102, may be a phone number for voice calls which can be managed by an Interactive Voice Response (IVR) system, or a phone number or short code number such as, but not limited to, a 4 or 5 digital number as sometimes used for making data calls such as Short Message System (SMS) calls.

The consumer's interaction may be transmitted as a message via a wireless network 109, to a proxy gateway 107A using a first set of protocols that are native to the wireless network such as, but not limited to, IVR, SMS or VoiceXML. The proxy gateway 107A may then translate the message from the native protocol of the wireless network 109 into a proxy message in a standardized uniform protocol, such as, but not limited to the ReachPointEventXML protocol of, LocaModa Inc. of Somerville, Mass., for the second network.

The proxy gateway 107A may then send the proxy message to a client, such as the client manager 105 via a second network 106, such as but not limited to, the Internet, using the standardized uniform protocol which may be the native protocol of the second network.

The client manager 105 may then receive the message and execute the appropriate function called for by the message such as, but not limited to, fetching additional content elements from the content server 110A via the second network 106.

In this way the proxy gateway 107A may translate a message into a uniform event representation that can be sent to any client, such as the client manager 105, and that client may respond with a further message in a universal response format representation that the proxy gateway may convert back into the native format of the originating network to be returned to the originating network or device. In such a system, adding a new gateway or new type of network only requires doing the translating to and from that gateway or network into the universal event representation and response formats without the clients having to have knowledge of the update or change. In a language analogy, the system speaks Esperanto so that rather than having to translate English to French, and German and then having to do a new translation between each of the languages every time a new language is introduced, only a new language to Esperanto and back is required when a new language is added, thus avoiding the N**2 (N Squared) scaling problem In an alternative embodiment, the proxy gateway 107A may generate proxy commands or interact with a communications management interface 107 to generate the proxy commands. In such an embodiment, the communications management interface 107 may translate a command such as, but not limited to, an IVR or SMS command into a universal ReachPointEventXML (i.e., Esperanto) that is sent to Client Manager 105, which will generate a corresponding and designated event. In one preferred embodiment, Client Manager 105 may execute the ReachPointEventXML event, resulting in one or more actions such as, but not limited to: (a) Generate a HTTP request of a well-defined HTML document and/or (b) play a local video file, and/or (c) send a response back to the user; all according to, for instance, unique XML protocol events such as the proprietary ReachPointEventXML methods defined by LocaModa, Inc of Somerville, Mass.

Such a system of proxy commands is effectively a uniform framework able to translate a native protocol from any network to a universal and standardized protocol of another network. In a preferred embodiment, the native protocol is one of an IVR network protocol and an SMS network protocol, and the universal standardized protocol is an XML protocol, such as, but not limited to, the ReachPointResponseXML and ReachPointExvent XML, as implemented by LocaModa Inc. of Somerville, Mass.

The consumer's interaction, which may be, but is not limited to, a response to view more content on the screen, an answer to a poll or competition, a request to download some software or some combination thereof, may be interpreted, executed and logged by the proxy gateway 107A, web server 110A, the communications management interface 107 or some combination thereof.

The consumer's interaction may, for instance, be received by the System Manager 110, which may forward it to the client manager 105, which may update the location content and, if applicable, may send a response back to the system manager 110 to relay back to the mobile user.

The client manager 105 may send, if applicable, a response or an update to the location screen 101. That update may, for example, instruct the screen to display new content. The update may instead or also perform some function such as, but not limited to, sending an answer to a poll, or incrementing or decrementing a vote, or perform some combination of such functions.

The client system manager 105 may also send a response via the system manager 110 to the user's mobile communications device 108. That message may, for example, thank the consumer for their interest in the content. The message could combine information from the consumer's profile or previous transactions, to create a more personal message. In a preferred embodiment of this invention, a message sent to a user's mobile communications device 108 would compliment a message sent simultaneously to the location-based, network addressable screen 101.

In a further preferred embodiment of the invention, the presentation displayed on the location-based, network addressable screen 101 (also known as a display or a location display) may be obtained from a web server that is a content server 110A. The web or content server 110A may, for instance, be a third party web site that is proxy command enabled or LocaTag enabled. The web server 110A may be responsive to proxy commands communicated from the mobile communications device 108 interpreted, in part, by software modules running on the client manager 105, or some combination thereof. The web pages may be native HTML, or may be augmented with additional HTML commands to further facilitate the interaction between the user and the web pages, as described in more detail below.

In a real estate application for example, client manager 105 may respond to a consumer's iteration by instructing the IVR system to play an audio prompt on their mobile communications device 108 such as "Press 1 to see House A." Simultaneously, the client manager 105 may relay corresponding visual prompts to the location-based network addressable screen 101. When the consumer enters the content ID 104 via their mobile communications devices, by, for instance, pressing on corresponding keys on their mobile communications device 108, client manager 105 may interpret the consumer's input and send an appropriate update to the location screen 101.

All consumer interactions may be logged by the system manager and/or 3.sup.rd party website, 110A and stored in a database which outputs report logs 111. Such system logs 111 can be very valuable to merchants as they may include information such as, but not limited to, location, time, date, the consumer's telephone number, and their product interest, or any combination thereof. Those of ordinary skill in the art will appreciate that such logs may be integrated into other aspects of a business such as, but not limited to, a merchant's Customer Relationship Management (CRM) database, that may be capable of building profiles of customers interacting with the system.

Whilst location data may be known by the system from the screen ID 102, it may also be supplemented by using the mobile communications device's area code if available. Furthermore, if the mobile communications device is able to output digital location information, for example such as its cell location or Global Positioning System (GPS) co-ordinates, the system may make use of this information instead of, or in addition to, the other location data.

In a preferred embodiment of the invention, there are several possible systems and methods of display management and content storage that may be used, dependent to some extent on the following considerations.

For bandwidth constrained applications or applications with large content files, such as, for instance, video files, that are required to be displayed, the system may have a client manager such as 105 at the location, pre-fetching and directly serving content to the screen 101. In such a configuration, the system only needs to pass the navigation commands to the client manager 105, which then serves up the locally stored content to the screen 101. New content can be sent via the system manager 110, in the background of a running application or during periods when the system is less active, as is done in, for instance, web caching. In any case, this design configuration is based on the concept that whilst the responsiveness of the system to user's commands happens in real time, new content is less critical and is therefore not required in real time.

Where bandwidth considerations are less critical, content may be served directly over the Internet 106 from the content manager 110A to screen 101.

In a further embodiment of the invention, there may be an adaptive software management system, capable of changing content on the location screens, such that it is optimized for its intended purpose. The adaptive management system analyzes the results or feedback from users of the system and may then make changes to marketing that is not performing to expected targets, by for example, changing the timing or style of content and measuring whether those changes produce better or worse results. Over time, changes initiated by the adaptive management system that improve results may be kept, thus evolving campaigns to be optimally effective.

In a further embodiment of the invention, there may be a proximity sensor, mounted, for instance, on or near each display, in order to measure the number of people passing within range of a location screen. Such a sensor may also be used to activate content or programs or turn the location screen on or off when it detects activity.

In accordance with yet another feature of the invention, data and content such as but not limited to information, ring tones or games can be downloaded to a mobile communications device for (i) use for a limited time or (ii) use for a number of uses or (iii) use within range of the networked computing device. The same system can permit transfers of the downloaded data in a format that enables the portable computing device that downloaded it to transmit a copy of it to another device together with rules for the usage of that copy.

The invention thus provides for an interactive direct marketing system and method, for typical use in public and retail spaces, capable of monetizing and/or enhancing the relationship between mobile consumers and merchants.

Figure 2:
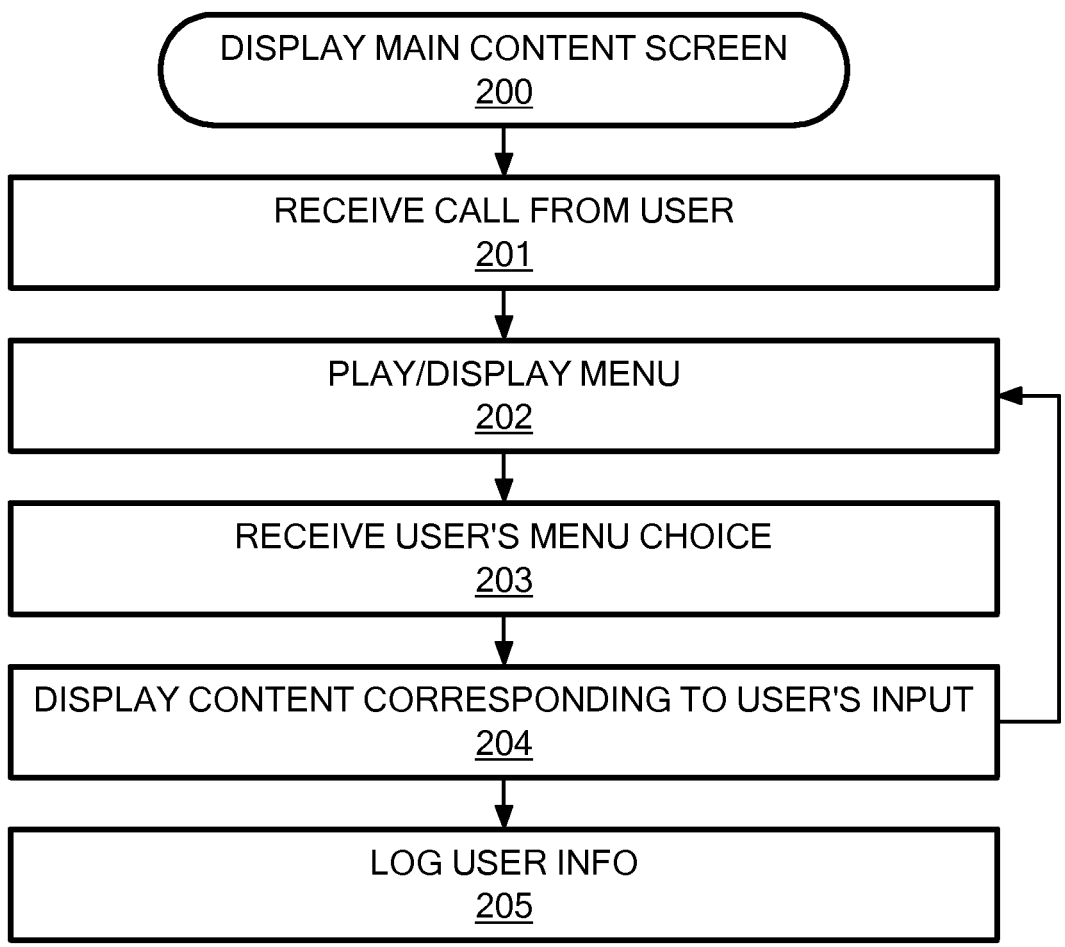
FIG. 2 is a flow diagram of the interaction between the system and a user.

The general sequence of steps that are performed in responding to a consumer's "remote-control" requests will now be described with reference to FIG. 2. This process is intended to illustrate, and not limit, the scope of the invention.

A network addressable screen displays various messages encouraging consumers to interact with it. For example a screen might display a message such as "Call 1-800-NEW-HOME to see houses for sale". The consumer, responding to such a prompt calls the displayed number. The system receives this call 201, and plays and/or displays a corresponding menu, 202, for example "Thank you for calling, please press 1 to see House A, press 2 to see House B . . . " This message may, for instance, be played via the IVR and/or displayed on the network addressable screen. The consumer may respond to such a message by making their desired choice and pressing a corresponding key on their mobile communications device. The system may receive the consumer's choice 203 and display the appropriate content, 204. Steps 202, 203 and 204 may be repeated until the consumer terminates the session.

The system may log all the consumer's interactions 205 such as interested content and time of interaction and can include the capture of the consumer's telephone number if the consumer and/or network operator have not blocked or disabled such information. Also, depending on the application, the system can request that the consumer leaves their name and other details as a voice message, before terminating the session.

Figure 3:
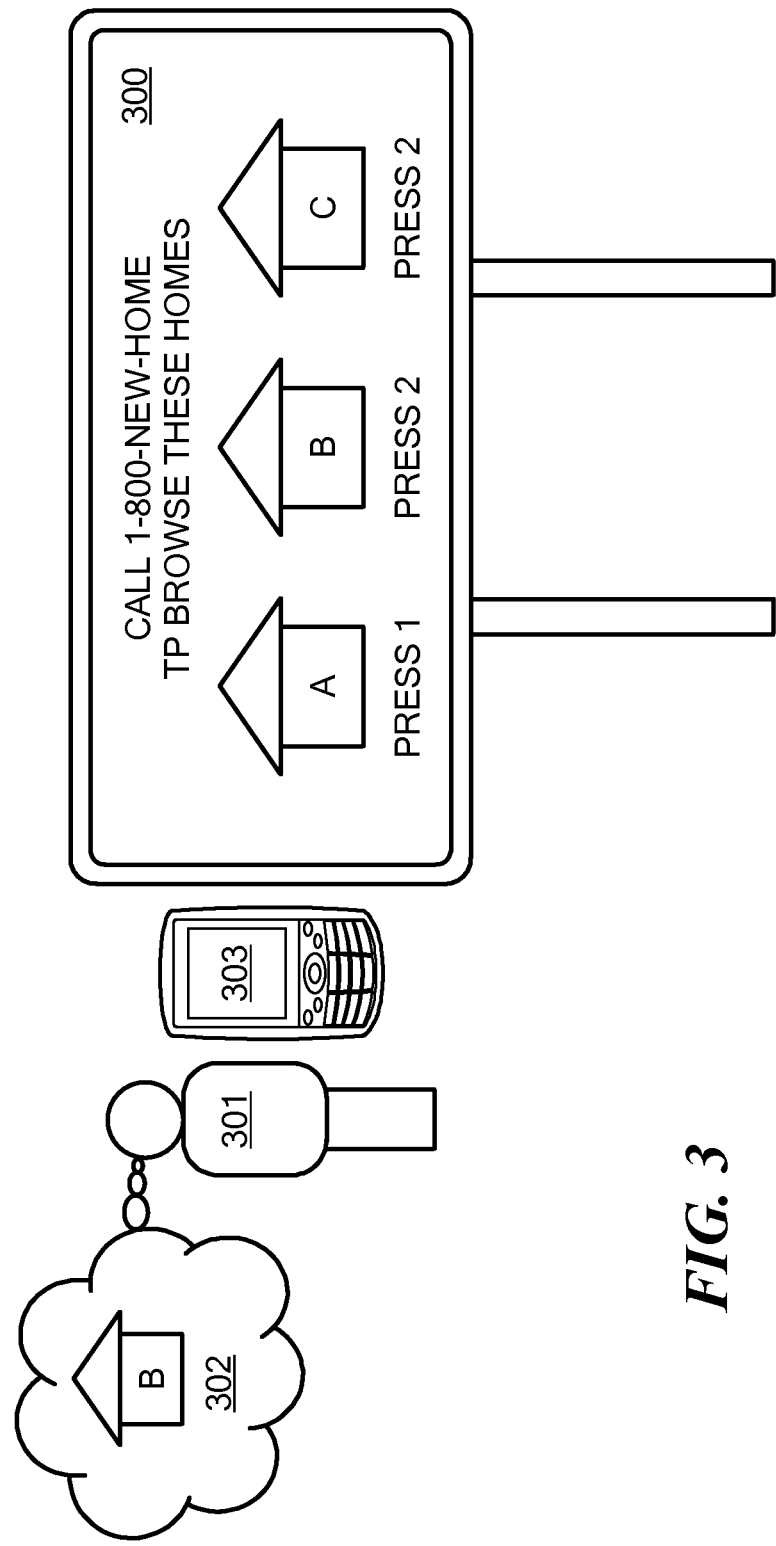
FIG. 3 depicts an example of a real-estate application.

This process is shown figuratively in FIG. 3 from the consumer's perspective. A consumer 301, sees content on a screen 300, for example in the window of a real estate agency. The consumer is interested in House B, 302 and calls the number displayed on the screen 300 via a mobile communications device 303.

Figure 4:
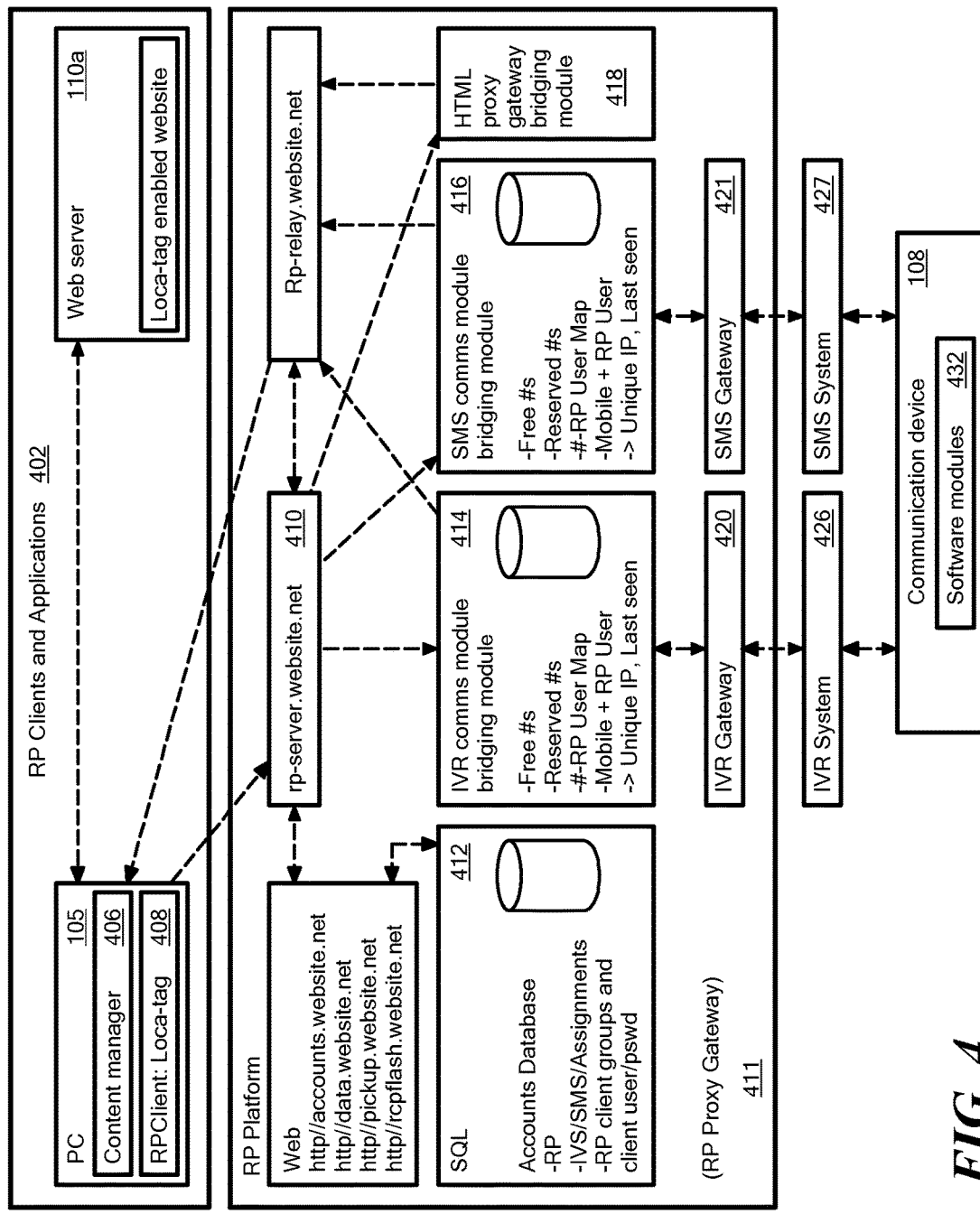
FIG. 4 is a schematic overview of system architecture for implementing a preferred embodiment of the present invention.

FIG. 4 is a schematic overview of a system's architecture for implementing a preferred embodiment of the present invention.

The RP clients and applications 402 include a client manager 105 and a content server 110 that is typically a web-server. The client manager 105 includes a content manager 406 and an RP client that deals with loca-tag 408.

The RP platform or proxy gateway 411 includes and RP server 410, an accounts database 412, and IVR bridge 414, and SMS bridge 416, an HTML proxy gateway bridging module 418, an IVR Gateway 420 and an SMS gateway 421. The IVR Gateway 420 and the SMS gateway 421 are typically servers. The IVR system 426 and SMS system 427 are typically networks. The communications device 108 may itself contain software modules 432.

Figure 5:
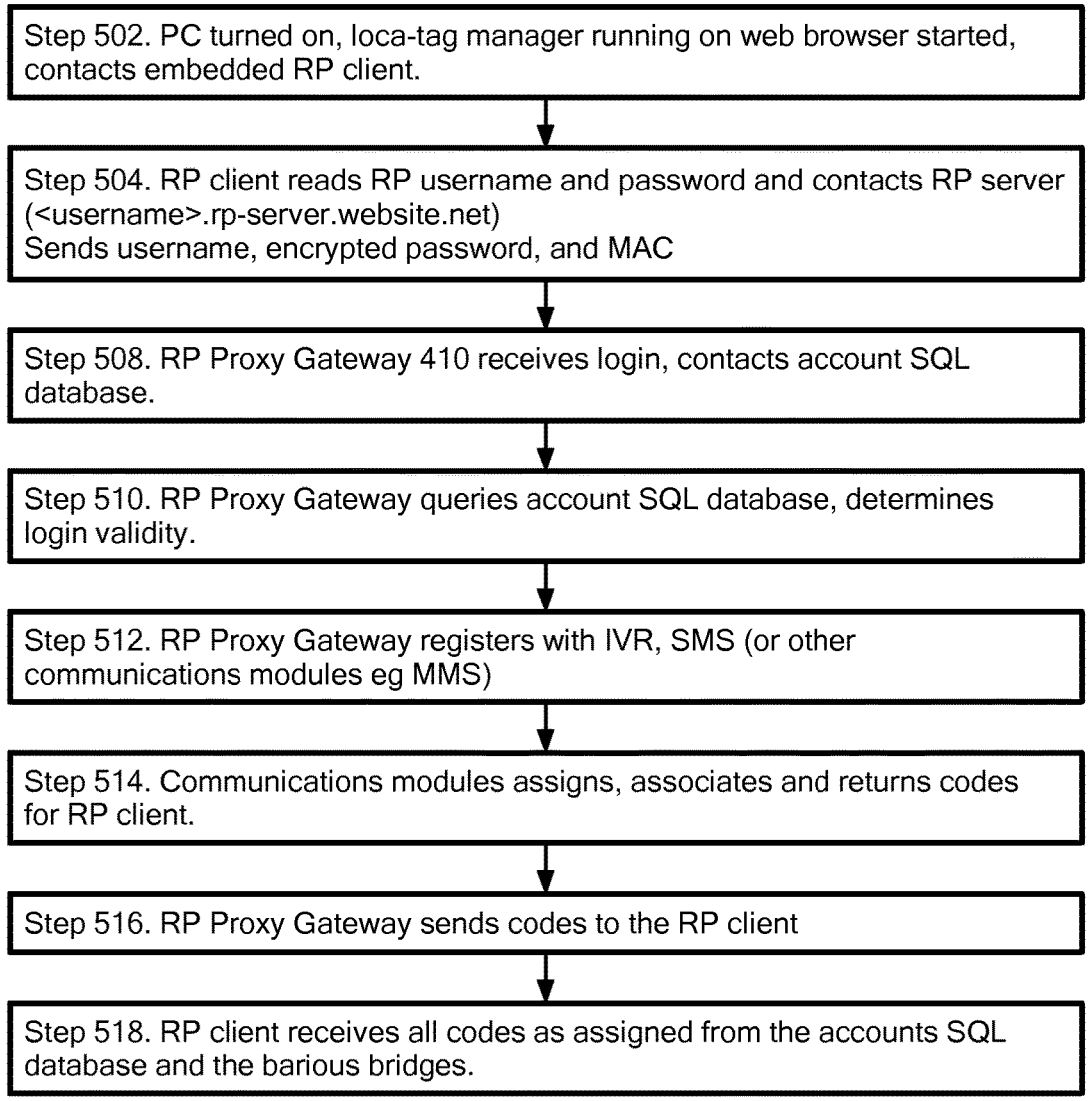
FIG. 5 is a flow diagram outlining the steps taken in a client logging on to a system in accordance with a preferred embodiment of the present invention.

FIG. 5 is a flow diagram outlining the steps taken in a client logging on to a system in accordance with a preferred embodiment of the present invention.

In step 502, when the personal computer (PC) machine, 404, is turned on, a loca-tag manager and a web browser 406 is started. This loca-tag manager instantiates an embedded ReachPoint (RP) client 408 and that RP client initiates a connection to the server 410 and prepares the web browser for content display.

In step 504, the RP client 408 reads a username, such as the ReachPoint (RP) username, and an associated password from a local disk, hard drive or other memory device on the PC 404. If no account information is found, the RP client 408 may use the PC MAC address as username. The RP client 408 contacts RP platform 411 that is a proxy gateway. The proxy gateway, RP platform 411, starts an RP server 410 using an address such as, but not limited to, <username>.reachpoint.website.net. The RP client 408 may also send the username, the encrypted password, and hardware MAC address of the PC 404. The encryption may, for instance, be performed using the well-known CRA-MD5 algorithm.

In step 508, the RP server 410 receives the login information, and contacts the account SQL database 412.

In step 510, the RP server 410 queries the account SQL database 412 to determine if the login information is valid. The accounts SQL database 412 typically stores all the Interactive Voice Recognition (IVR) telephone numbers, the short messaging system (SMS) codes, client read only environment (ENV) variables, and client writable persistent data. The accounts SQL database 412 may also have an "auto-set" flag that can be toggled through, for instance, an account manager software module, that allows for a one-time username/password transmission so that RP clients can be boot-strapped without needing a keyboard.

In step 512m, the RP server 410 now has all the allowed features supported by the RP client 408 such as, but not limited to the SMS and IVR allowed features. The RP server 410 registers with each proxy gateway bridging module such as, but not limited to, the IVR proxy gateway bridging module 414, the SMS proxy gateway bridging module 416 and the HTML proxy gateway bridging module 418. This registration may, for instance, take the form of obtaining one or more codes and registering the events that those codes should map to the given user.

In step 514, the registration may proceed by means of a SQL query to an appropriate database on the appropriate proxy gateway bridging module. The SQL query typically returns a list of reserved codes for the RP username of the RP client 408. If no reserved codes are found or available, a code is assigned out of an unused-pool. If no codes are available, an error is returned. A SQL update on the appropriate proxy gateway bridging module associates the codes with the assigned username and the appropriate RP server 410.

In step 516, the RP server 410 now has all codes and has registered them as being associated with the given user, located on this server. This data may now be returned to the RP client 408.

In step 518, the RP client 408 receives all codes as assigned from the accounts SQL database and the various proxy gateways bridging module. The RP client 408 does not get to request types or quantities of codes, as these are set in the accounts databases.

Figure 6:
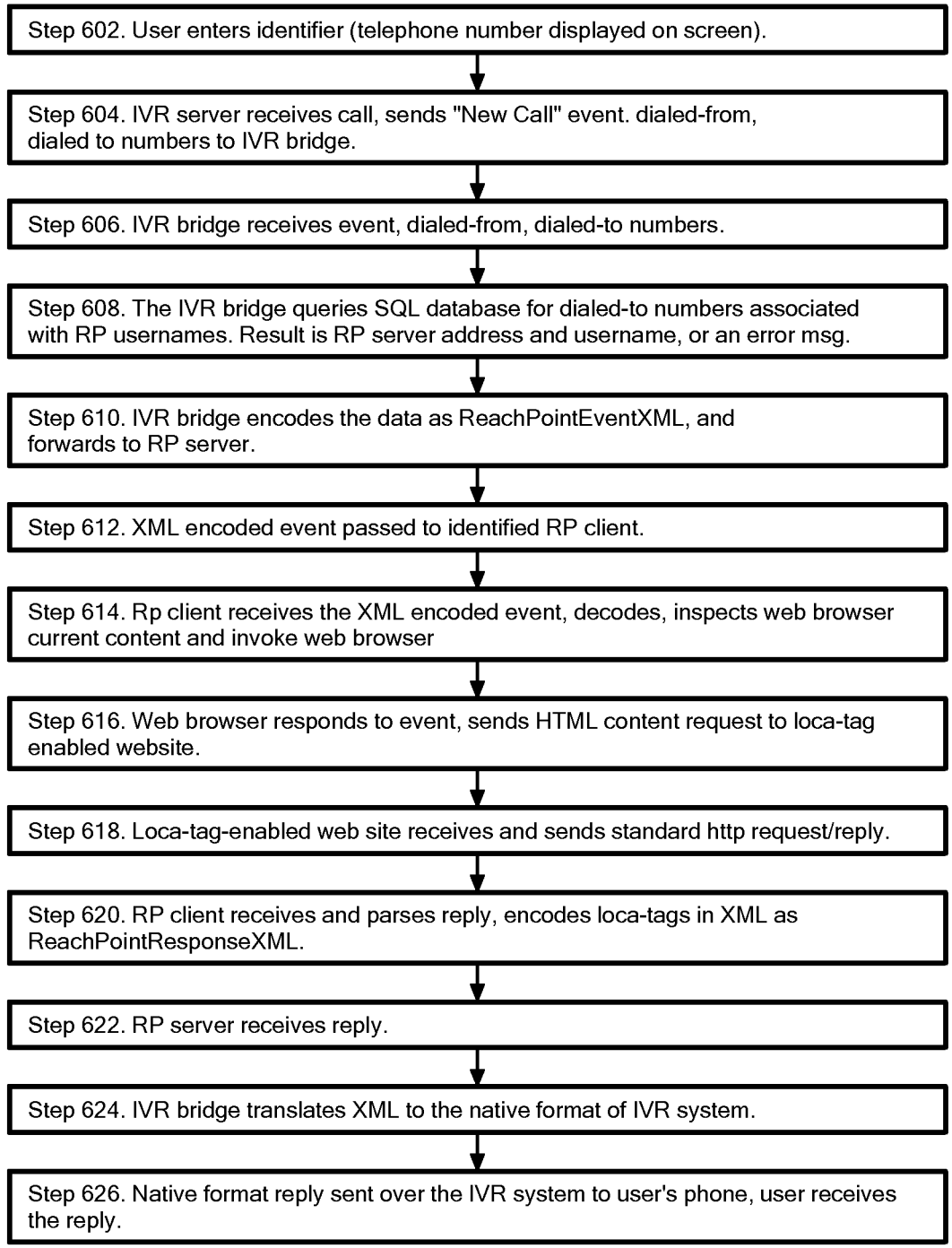
FIG. 6 is a flow diagram of a user initiating an event in accordance with a preferred embodiment of the present invention.

FIG. 6 is a flow diagram of a user initiating an event in accordance with a preferred embodiment of the present invention. In particular, FIG. 6 shows the flow-of-events for a client dial-in using an interactive voice receiver (IVR) system.

In step 602, a user enters an identifier such as, but not limited to, a telephone number displayed on an interactive, location-based display system screen 300.

In step 604, an IVR server 420 receives the call, and sends an event, such as but not limited to a "New Call" event and the associated dialed-from and dialed-to numbers, to the IVR proxy gateway bridging module 414.

In step 606, the IVR proxy gateway bridging module 414 receives the event, including the dialed-from, and the dialed-to numbers.

In step 608, the IVR proxy gateway bridging module 414 queries its own database, which may be, but is not limited to, a SQL database for dialed-to numbers associated with RP usernames. The IVR proxy gateway bridging module 414 may also check if any RP username found allows for simultaneous multiple dial-ins. The result of the query is typically an RP server address and username, or an error message.

In step 610, the IVR proxy gateway bridging module 414 encodes the data it has received, or found, into an appropriate format such as, but not limited to an eXtended hypertext Markup Language (XML) format. In a preferred embodiment, the XML format is known as ReachPointEventXML. The data encapsulating the event is then forwarded to the appropriate RP server 410.

In step 612, the XML encoded event is passed to the identified RP client 408, or added to the client queue if another event is in-progress.

In step 614, the RP client 408 receives the XML encoded event, which in a preferred embodiment may be a ReachPointEventXML event. The RP client 408 decodes the XML and, if an appropriate tag such as a LocaTag is found, the RP client 408 may decode it and may invoke an associated action in the web browser 406.

In step 616, the web browser 406 responds to the "clicked" or selected event. This may, for instance take the form of fetching content such as an HTML page, or component, located at a universal resource locator (URL) that is an address at a loca-tag enabled website 422 running on a web server 424.

In step 618, the LocaTag-enabled web site 422 receives the request of event, and sends a reply that may be an HTML page or component.

In step 620, the RP client 408 received the reply and if the reply contains a LocaTag, encodes it in appropriate XML format, such as ReachPointResponseXML.

In step 622, the RP server 410 receives any reply. If there are any additional events bound for the RP client 408, they may now be sent individually or pipelined, as appropriate.

In step 624, the IVR proxy gateway bridging module 414 translates the XML format response, which may for instance be in ReachPointResponseXML, back to the native format of the IVR system 426 network.

In step 626, the native format reply is sent over the IVR system 426 network back to the user's network addressable communications device 430, so that the user receives the reply.

Figure 7:
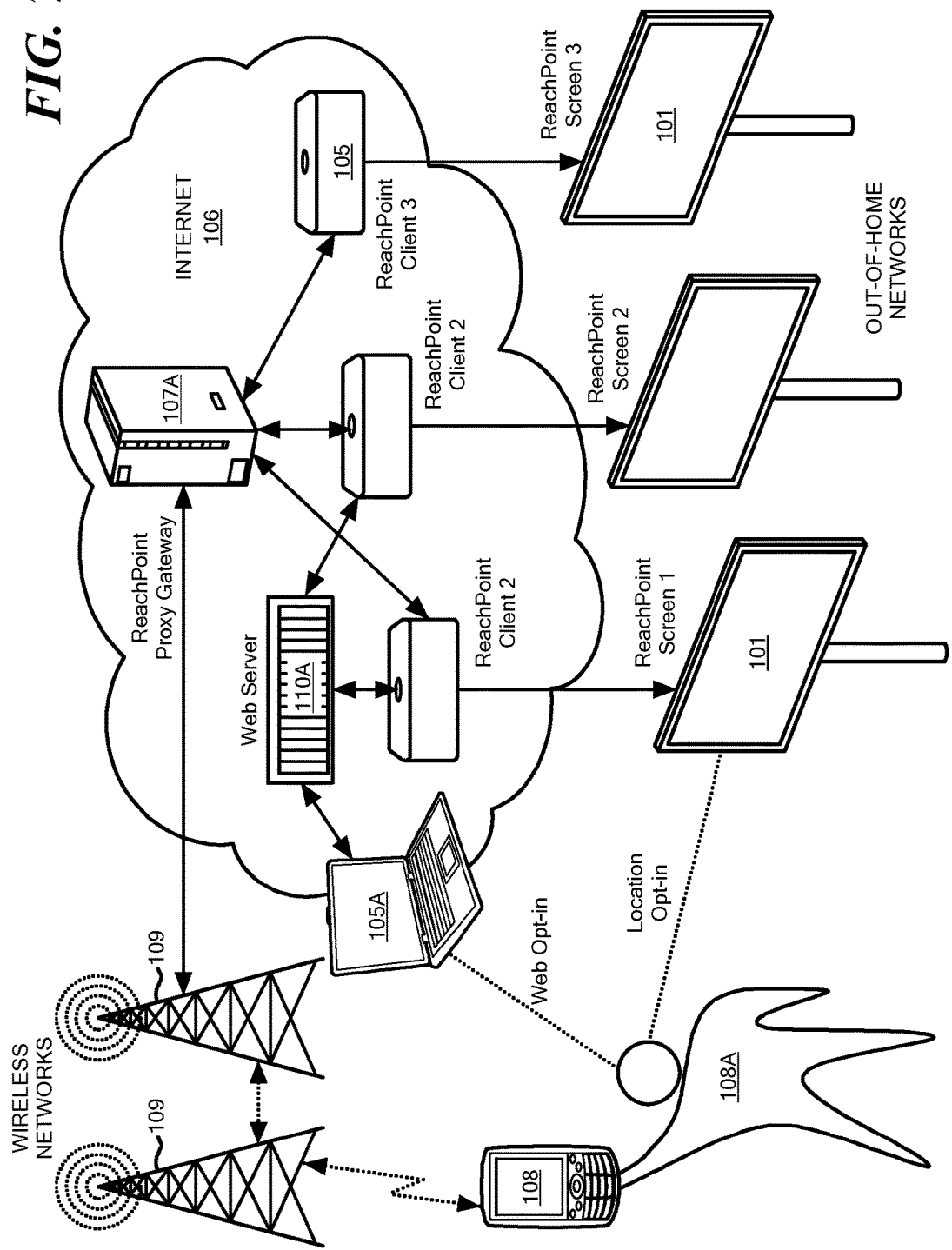
FIG. 7 is a schematic diagram showing a preferred embodiment of the present invention.

FIG. 7 is a schematic diagram showing a preferred embodiment of the present invention. A user 108A opts-in to multi-media content on a location-based ReachPoint screen such as, but not limited to, a net-work addressable screen 101, by either dialing a number in an IVR-based applications or texting a number or a shortcode in an SMS-based applications, using a network addressable communications device 108.

The user's call is sent via a wireless network that may be, but is not limited to a cellular network 109 and either an SMS aggregator (not shown) or an IVR service (not shown) to a Proxy Gateway 107A.

The Proxy Gateway 107A receives the user's call. With UVR calls, the IVR system will typically answer the call and request that the user 108 enters a screen ID. With SMS calls, the system typically requires that a Screen ID is sent along with the number or short code sent to access the system.

Subject to the message type, the Proxy Gateway 107A translates the message into a uniform event that gets sent to the required destination.

The ReachPoint Client (RPC), typically embedded in a client manager 105, receives the event and can then decide how best to execute the users intentions. The RPC may, for instance, fetch any required content such as, but not limited to fonts, jpegs, page styles, movies or some combination thereof, either from a cache memory or from a web server, that may be a content server 110A via the internet 106.

The network addressable screen 101 then displays the content according to user's interactions. The user 108A may then see and may choose to respond to the screen 101's display.

Figure 8:
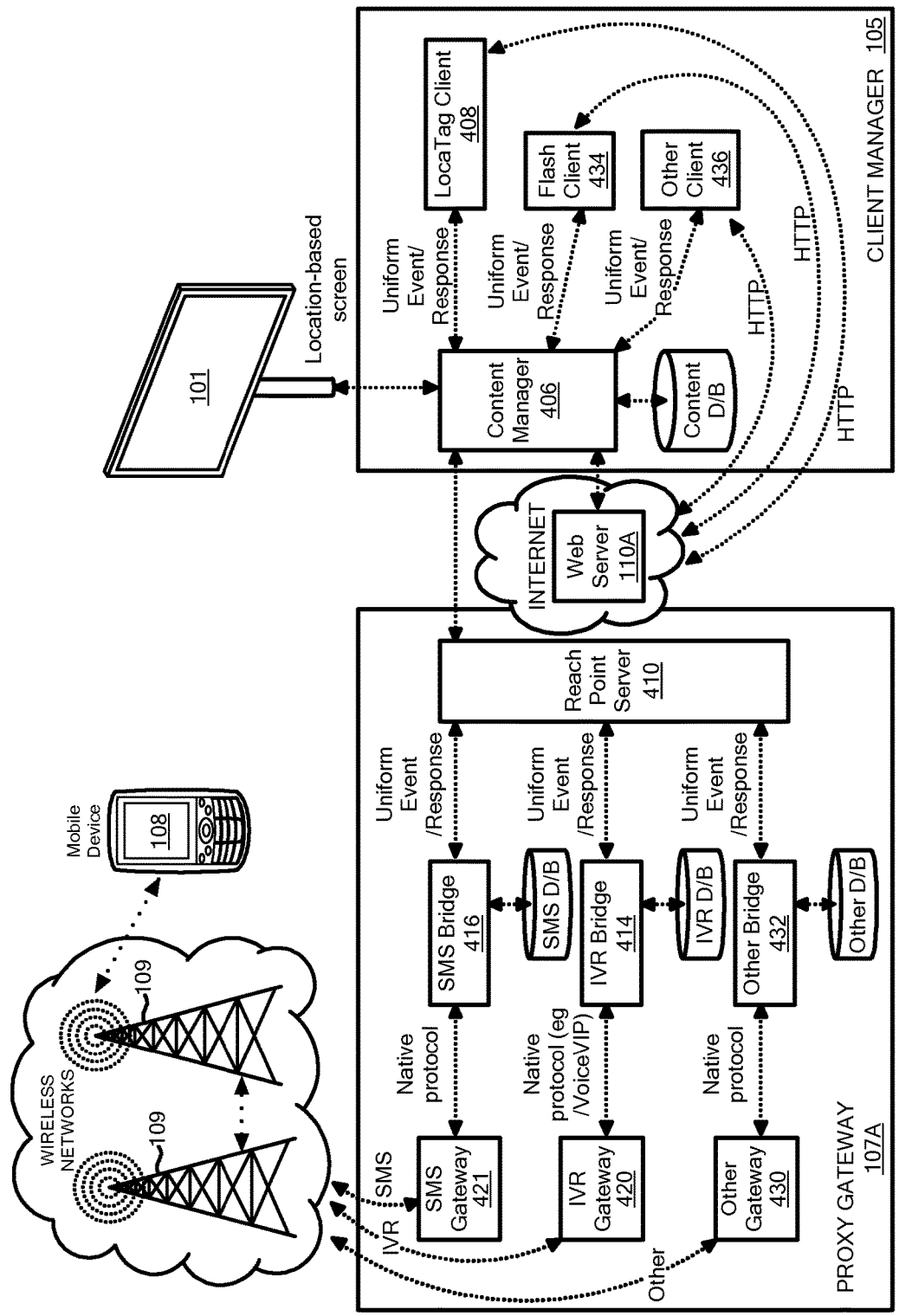
FIG. 8 is a schematic diagram showing a layout of a preferred embodiment of the present invention.

FIG. 8 is a schematic diagram showing a layout of a preferred embodiment of the present invention. The layout shows the communications from a network addressable communications device 108 via a wireless network 109 to a proxy gateway 107A.

The proxy gateway 107A contains an SMS gateway 421, an IVR gateway 420 and another gateway 430. The other gateway may be, but is not limited to a Blue tooth gateway, a VoIP gateway or a WiFi gateway. There is also an SMS bridge 416, an IVR bridge 414 and another bridge 432 and their associated databases.

Communications between the gateways and the bridges is typically in the native protocol of the gateway, such as, but not limited to VoiceXML from the IVR gateway. Communications between the bridges and the Reach Point server 410 is in a Uniform Event/Response protocol that is typically a standardized XML protocol such as, but not limited to the LocaModa defined ReachPointEventXML and ReachPointResponseXML.

The proxy gateway 410 communicates over a network 110A such as, but not limited to, the Internet to a client manager 105. This communications is in the Uniform Event/Response protocol. The client manager 105 includes a content manager 406 and associated database. The content manager 406 may communicate with local clients such as, but not limited to a LocaTag client 408, a Flash client 434 and another client 436 using the Uniform Event/response protocol. The clients may then communicate with the content server 110A, commonly also known as a web server, using hypertext transfer protocol (HTTP), a protocol commonly used in Internet communications to transfer HTML pages.

Someone of ordinary skill in the art will appreciate that the ReachPoint client (RPC) need not be physically located near the content manager and display. Additional post processing after the client event is received could be performed and sent to a screen(s) for example to allow display mirroring.

Someone of ordinary skill in the art will also appreciate that a ReachPoint Client (RPC) can be dynamically executed over the web, by downloading a software implementation written in a web compatible architecture, such as JAVA Bytecode, or Flash Action Script.

The marketer may also enable their website, located on the content server 110A, to continue the user experience by including a mobile phone field on their website that links to the LocaModa user database. The user's location session can then be associated with the relevant website information. For example a user browsing a realtor's website after browsing the realtor's location-based screen, may be shown a house they browsed on the realtors' location-based screen.

As described above, in a preferred embodiment of the present invention, a digital interactive marketing system and method consists of at least one display device located in a distinct geographic location and coupled to a network. The system is capable of providing content over that network to each display device in the network. Each display device has a unique identifier. There is also a unique identifier for every browsable piece of content on each display device. The invention may also include a second network, capable of receiving communications from, and transmitting communications to, an electronic communications device. Connected to this second network is a means for receiving a request from the electronic communications device for a particular view on a display device. The system further includes a communications management interface capable of guiding, responding to, outputting and logging a user initiated communication from an electronic communications device, and a content management system capable of receiving, storing and sending commands for content or the actual content over a network, a content management system capable of associating content with unique identifiers, a content management system capable of receiving and responding to instructions to direct content to other parts of the system, such as but not limited to, any or all display devices, whether individually or severally, or storage mediums, or other content management systems. The system is further capable of providing navigation prompts and system instructions to a communications management interface, and to the display devices.

In a further embodiment, the system may further include a customer logging system, capable of capturing and storing any voice or data entered by callers to the system, building profiles of customers and recording their interactions. The system may log various customer related data including, but not limited to a caller telephone number, a screen telephone number, a product code, a decision code that encapsulates events such as, but not limited to, whether a customer decided to buy, or decided to bookmark an item, a time of call and a duration of a call.

In a further embodiment, the system may further include an extensible message schema, capable of recognizing that a message sent to the system by a user, is intended for a specific location and means for displaying content on a specific display device or a plurality of display devices.

In a preferred embodiment of the system, the network capable of coupling the system with the display devices, is the Internet, and the content on a display device is video, graphics or text.

In a further preferred embodiment of the system, the unique identifier for each display device is displayed on the display device and is one of a telephone number, a telephone number plus an extension number, a Short Message System (SMS) short code, a SMS short code plus keyword, an electronic mail address, an instant message address or a combination thereof. (Note: Screen ID might be additional to phone number, ex., NYC123)

In a further preferred embodiment of the system, the unique identifier for every browseable piece of content on each display device is one of a number, a letter or alphanumeric code, a product code such as but not limited to a brochure code, or a house listing code, or a UPC code or some combination thereof.

In a further preferred embodiment of the system, the network capable of receiving communications from and transmitting communications to electronic communications devices, is a wireless network such as but not limited to cellular, 802.11 (WiFi), Bluetooth, 802.15.4 (ZigBee), WiMax, or Radio Frequency Identification (RFID) or a combination thereof.

In a further preferred embodiment of the system, the user's electronic communications device is a mobile wireless device, such as but not limited to a mobile phone, handheld computer, laptop computer or personal digital assistant (PDA).

In a further preferred embodiment of the system the communications management interface capable of guiding, responding to, outputting and logging a user initiated communication is one of an Interactive Voice Response (IVR) system, that may be capable of handling a plurality of callers, and that may be capable of voice recognition, and a Short Message System Center (SMSC), that may be capable of handling a plurality of callers.

In a further preferred embodiment of the system, the content management system may be connected directly to a display device to avoid having to communicate large content files over a network.

In a further preferred embodiment of the system, the navigational prompts sent via the user's electronic communications device may be one of voice prompts over an IVR system that may compliment or match prompts graphically represented on the display device and data prompts sent in formats such as but not limited to HTTP, XML, SMS, MMS, or a combination thereof.

In a further preferred embodiment of the system, the Messaging Proxy Gateways, are constructed using XML, a universal and standardized format, such that messages may to be switched seamlessly between multiple proxy gateways and clients. The messages may additionally be sent and received in real time.

In a further preferred embodiment of the system, the messaging proxy gateways may further support services such as, but not limited to, internet protocol (IP) services including streaming audio, streaming video and Internet telephony, or any combination thereof.

In a further embodiment of the system, there may also be a qualification interface, capable of prompting a user to respond to queries that help the system direct the user's message according to rules set by a system controller.

In a further embodiment of the system, there may also be an interface enabling the consumer to download data, the data being one of a ring tone, a game, a graphics file, a music file, and a video file or a combination thereof.

In a further embodiment of the system, the IVR system format is VoiceXML.

In a further embodiment of the system, user specific data is captured, that may be captured from the user's electronic communications device such as but not limited to, a mobile phone number, area code, cell ID and GPS co-ordinates.

In a further embodiment of the system, the user can be patched (transferred or bridged) into a separate subsystem such as an outside live attendant, auto attendant or voicemail (VM). For example, in a real estate application, a user may be patched to a VM, while in a restaurant application, a user may be patched to a hostess.

In a further embodiment of the system, the user specific information includes details such as but not limited to the user's name, address, or PIN, demographic information such as, but not limited to, the location of the display device, the user's area code.

In a further embodiment of the system, the display device may display an invitation to visit a website address for users to get more information. The website may invite users to enter their telephone number into the system and, having entered their telephone number into the system, the system, having previously captured the user's telephone number, may identify the user and/or the products that they were interested in.

In a further embodiment of the system, there is an adaptive management system, capable of changing content displayed on at least one display device, according to the expected and resulting response rates of users in order to maximize the effectiveness of marketing the said content that may be made in real-time. These adjustments may be made according to criteria such as, but not limited to, a frequency of responses, a timing of responses, a design of content and a pricing of responses, or some combination thereof.

In a further embodiment of the system, there may be a proximity sensor, mounted in such a manner on or near the display device, so as to measure the number of people passing within range of each display device. The display device may be programmed to activate on receiving a signal from a proximity sensor.

In a further embodiment of the invention, one of more logs are output to a Customer Relationship Management (CRM) system.

In a further embodiment of the invention, the display device may be updated according to information already known about the user.

In a further embodiment of the invention, multiple campaigns may be run simultaneously using the same text or phone numbers or addresses and differentiated via the unique electronic address or phone number associated with each display device.

In a further embodiment of the invention, multiple campaigns may be run simultaneously using the same text or phone numbers or addresses and differentiated via the unique content ID associated with every interactive content element.

In a further embodiment of the invention, when a user is known to the network or system, i.e. the system has previously captured the user's phone number or the user has registered with the system via the web, when that user connects to a particular location screen, the location screen can present personalized information for example based on the users stored profile, or demographic information or on the user's prior behavior in interacting with the system. For instance, if the user previously searched for real estate of a particular type, when the user connects to a location screen, the screen may show the user real estate of a similar type in the vicinity of the current screen. Similarly, the system may present items or categories such as, but not limited to real estate, restaurants, hotels, automobiles or services that may be found in the vicinity based on recognizing the user's telephone number and having access to the user's past preferences or search behavior in interacting with the system.

In a further embodiment of the invention, a website may be configured to effectively use phone numbers as cookies, i.e., the website is configured to understand that a user's phone number is either known or new to the LocaModa ecosystem. When a user types their phone number into such a website, the website can display personalized information relating to the user's location experience. In one exemplary scenario, a user may view some item on a website using a location-based display, using their cellular phone to interact with the screen. Later, the user may wish to review that item. They may then log onto the website from, for instance, their home or office computer and surf to the website. They may then be given an option to enter their cell phone number. The website may recognize the number and welcome the user back. The website may then also present the user with the pages seen at the remote location, or make that an option. For instance, a user may have been looking at real estate and seen a house they now want to show to someone else. In a further embodiment, the option to revisit a site seen at a location may be made as part of a central service. A user may, for instance, visit a home page of a location-based presentation service provider, and have as one of the menu options, the ability to search by phone number a history of locations, sites and pages visited. Such a service may be suitably protected by, for instance, a user password or other security arrangement.

In a further embodiment, a merchant website may have, as part of their standard registration, a telephone number aware field. In this way, in addition to storing information such as credit card account and authorization, shipping and billing addresses, user names and passwords, the merchant site may also store the user's cellular phone number. Then, when that merchant's site is accessed via a location-based display using that cellular phone, the site may recognize them and automatically provide the ability to make secure purchases. For instance, if a site such as the Amazon.com site is made cellular phone aware, a user logging on to the site via a location-based display using a cellular phone, may automatically have their "one click" purchase account available to them. In this way, a website that has the LocaModa aware phone field, is now able to offer products and services related to a user's location experience. As a further exemplary scenario, a user may interact with a city guide screen that offers a book of the city from a merchant such as, but not limited to, Amazon.com at 50% off. The user later visits or surfs Amazon.com, (this scenario presupposes that the user then types in their phone number). Amazon then recognizes their phone number, and because the Amazon.com site is configured to be LocaModa aware and because the user is already an Amazon user, the website takes the user to the book and the user presses BUY.

In a further embodiment of the invention, a location-based display may offer services in which multiple users may participate at the same time. For instance, many users may participate in a game such as, but not limited to, a game of chance. In an exemplary embodiment, a game, such as, but not limited to Digital Pacinko may be displayed on a screen. Pacinko is a popular gambling game in Japan in which metal balls drop through a maze of pins. Prizes may be won dependent on where the deflected balls end up. In digital Pacinko, the trajectory of image of balls through a set of pins may be simulated using random numbers. In an IVR based version of the game on a location-based screen, users may register to participate by dialing into a number displayed on the screen. Once connected, instructions may appear on the screen or they may be relayed to individuals via voice messages. The voice message may instruct a particular user to choose a ball from a selection such as, choose ball 1, 2 or 3. When that user makes their selection by, for instance pressing one of the available numbers, 2, on their telephone, that ball, number 2, will then drop through the pins and any prize may be credited to that user.

In a further embodiment of the invention, as part of an IVR Game or as an advertising or promotional activity, an interactive avatar or mannequin may be configured by the user by selecting numbers, corresponding with options such as hair color, or body shape. The number selection can be an aggregation of users' selections, for example, if most users select a number corresponding to "Warrior", then the application could display a Warrior avatar.

In a further embodiment of the invention, the system may be used to facilitate an IVR trivia contest, a poll, an election or other related games. For instance, the network addressable screen may display questions with answer options. Users may then select a number on their phone corresponding with the answer they believe is right. Multiple users may play and the network addressable screen shows how many people are voting on each answer. The person/people with the most right questions may be recognized by the system and can be called back or displayed on screen in some manner such as, but not limited to, their name, their picture, or their icon. The same feedback and recognition may be applied to the poll, election and other game applications detailed above.

In a further embodiment of the invention, the system may provide takeaway information. The system may, for instance, send a user information relating to their interaction so they have something to "walk away" with that may help them continue the relationship with the marketer. The walk way item may be, but is not limited to, a text message, a URL or a MMS message, that may be downloaded to the user's communications device.

In a further embodiment the user may bookmark or phone mark an item or a site. This may be done by URL forwarding or by the system logging the information. For instance, a user may find information on a location-based network addressable screen that may be bookmarked by selecting a number corresponding with an instruction in the system to record that page as a bookmark. When the user later enters an identifier, such as their user ID, pin or phone number in an enabled website, the information that they found at the location-based network identifiable screen may be presented to them. In this way the system effectively enables a user to continue a search or journey begun on one network to be continued on another network. The continuation may occur in either direction, so that a user researching product information on a web using a home PC may, by bookmarking or phone marking that information with an identifier such as their cellular phone number, may continue that search at a location-based network addressable screen using their cellular phone to control the further interaction.

The bookmarked items may include any multi-media content including, not limited to, documents, programs, images, video, pointers, addresses, URLs and/or permalinks. In a further embodiment, the bookmark function may be used to subscribe or syndicate to updates by requesting for example Really Simple Syndication (RSS) feeds, on a particular product, or products similar to one selected, to be sent for example to the user's phone or email address.

In a further embodiment of the invention, the system may be used as an inventory control. The system may, for instance, be designed to display items on sale, or items remaining. The system can then display a message requesting users to call to reserve an item. When the user collects the item, which may occur on or off line, they may identify or verify themselves using their phone number or other identifier.

In a further embodiment of the invention, the system may be used to facilitate a graphic answering machine or PBX proxy visual guide. The framework, for instance, may be used to enable a web-based, configurable answer machine. In such a system, when a user calls a telephone number from, for instance, their desk phone, a web page related to the company or person being called may appear. The web page may indicate a company structure, the availability or presence of various members of the company and give options to press to reach specific people, functions or departments. All this may be enabled by the proxy gateway architecture detailed above. In this way a web-based answer machine framework may provide a rapid and graphic interface to enable phone users to find the person or function they require without having to single step through the maze of voice prompt menu choices.

In a further embodiment, the system may be used to display other people having a shared interest. For instance, people who have entered their interests via, for instance, their phone or on-line, into the system, and enabled them to be viewed by others, may then identify others with similar interests in locations or on the web, from locations or from on the web.

In a further embodiment the user may have a buddy list. As with people having a shared interest, linking buddy lists to the system, may allow users to discover when or if buddies are logged into location screens, and so obtain, effectively, the presence of people and/or objects at those locations.

In a further embodiment of the invention, the system may be used to facilitate the exchange of play lists of songs. For instance, the system may be used to send, receive, capture or send alerts related to play lists of songs such as the well know iTunes play lists. The system may, for instance, enable users to display their play lists, or, if a user likes a song playing on a LocaTag enabled system, they could request info from that song or play list. Such info could be sent to their phones or bookmarked to be browsed on line at a later date.

In a further embodiment of the invention, the system may be used to facilitate an online auction. By carrying out an auction on a location screen, users can use their phones to engage with the same ecosystem as a web-based site.

In a further embodiment of the invention, the system may be integrated with a navigating system such as, but not limited to, the global positioning system (GPS). For instance, for devices with in-built GPS, the system may send GPS coordinates to the mobile device enabling the user to navigate to an advertised location.

In a further embodiment of the invention, the system may be used to facilitate feedback, including immediate feedback, via a mobile device, such as a cellular phone to a website. For instance, diners at a restaurant could send feedback about a meal as it is happening or shortly after it happened. Other patrons at, for instance, a location screen in the bar, or prior to visiting the restaurant, or when making a booking may see the information.

In a further embodiment of the invention, camera enabled phones could be used to provide local images and video. For instance, pictures and other media from compatible phones and networks can be exchanged between the system and users.

In a further embodiment of the invention, a user could use preloaded instruction blocks, or macros. For instance, members of the system could pre-program or upload potted macros and/or search strings for the location experiences. A key word or set of symbols could be predefined to stand for a much longer instruction. For example a macro for "find hi-fi bargains" could be downloaded, then when the user visits a mobile enabled hi-fi store, they call the system and are guided to the bargains, either by their telephone number being recognized as being associated with the macro, or by entering a particular key or set of symbols. In a city guide application, for instance, a user may have the macro, French Restaurants, then when they call the city guide, it takes them directly to French Restaurants.

Although the invention has been described with respect to Network Addressable devices, one of ordinary skill in the art would readily appreciate that such systems and methods may also be constructed wholly or in part using Network Identifiable device. A Network Identifiable device is one that may have a mono-directional relationship with the system, i.e., it can issue a command, but might not be able to respond. For example, a proximity detector connected to a RF transmitter could fire off a command to play a movie, but is effectively "deaf," i.e. not addressable in any other sense.

Although the invention has been described with respect to devices in which the content is pushed to the client, one of ordinary skill in the art would readily appreciate that the systems and methods described above may be adapted to include clients that poll for content. Such systems may have disadvantages with respect to the preferred embodiments of the present system in that, for instance, they would be less scalable and make less efficient use of bandwidth, they may, however, be applicable in particular circumstances.

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

INDUSTRIAL APPLICABILITY

In the field of advertising there is significant interest in the location-based advertising systems and methods of this invention, so that advertisers may, without pushing information or messages, reach potential customers physically at or near a location where the items being advertised can be viewed or purchased.

Such systems and methods would be of considerable utility for a variety of merchants including realtors, travel agents, car dealers and supermarkets.

What is claimed is:

1. A method, comprising:
   receiving, at a gateway communicably coupled between a web server and a wireless public land mobile communication network (PLMN) distinct from the Internet, a first transaction, identifying a mobile communication device, the mobile communication device being addressable via the internet, and comprising a mobile communication device identifier;
   storing, in a location other than on the mobile communication device:
      the mobile communication device identifying information received in association with the first transaction, the first transaction particularized to the mobile communication device based at least in part on the mobile communication device identifier; and
      other information related to the first transaction;
   in association with a subsequent transaction:
      receiving, at the web server, a command and the communication device identifier over the Internet from the mobile communication device; and
      translating the subsequent transaction and received command to the web server;
      completing the subsequent transaction at the web server by using:
         the mobile communication device identifying information received in association with the subsequent transaction;
         the stored mobile communication device identifying information; and
         the stored information related to the first transaction.

2. A method as defined in claim 1, further comprising:
   in association with the first transaction, receiving information identifying an account; and
   storing, in a location other than on the mobile communication device, the received account information; and
   wherein completing the subsequent transaction comprises:
      accepting a purchase request; and
      using the mobile communication device identifier and the stored account information to fund the purchase request.

3. A method as defined in claim 1, wherein the first transaction is initiated by the mobile communication device.

4. A method as defined in claim 1, wherein the first transaction is initiated by a device other than the mobile communication device.

5. A method as defined in claim 1, wherein the subsequent transaction is initiated by the mobile communication device.

6. A method as defined in claim 1, wherein the subsequent transaction is initiated by a device other than the mobile communication device.

7. A method as defined in claim 1, wherein the information identifying the mobile communication device comprises a telephone number of the mobile communication device.

8. A method as defined in claim 1, wherein receiving the information identifying the mobile communication device in association with the first transaction comprises automatically receiving the mobile communication device identifying information.

9. A method as defined in claim 1, wherein receiving the information identifying the mobile communication device in association with the first transaction comprises receiving an indication of user-entered identifying information.

10. A method according to claim 9, wherein receiving the information identifying the mobile communication device comprises providing a visual display on a device other than the mobile communication device inviting the user to enter into the first or the second transaction.

11. A method as defined in claim 1, wherein receiving the information identifying the mobile communication device in association with the subsequent transaction comprises automatically receiving the mobile communication device identifying information.

12. A method as defined in claim 1, wherein receiving the information identifying the mobile communication device in association with the subsequent transaction comprises receiving an indication of user-entered identifying information.

13. A method according to claim 12, wherein receiving the information identifying the mobile communication device comprises providing a visual display on a device other than the mobile communication device inviting the user to enter into the first or the second transaction.

* * * * *